No. 618,464. Patented Jan. 31, 1899.
G. A. KELLEY.
OPERATING MECHANISM FOR VALVES.
(Application filed Aug. 14, 1897.)
(No Model.) 2 Sheets—Sheet 2.
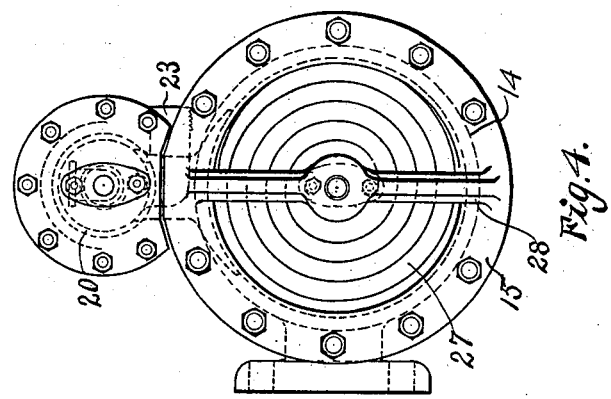
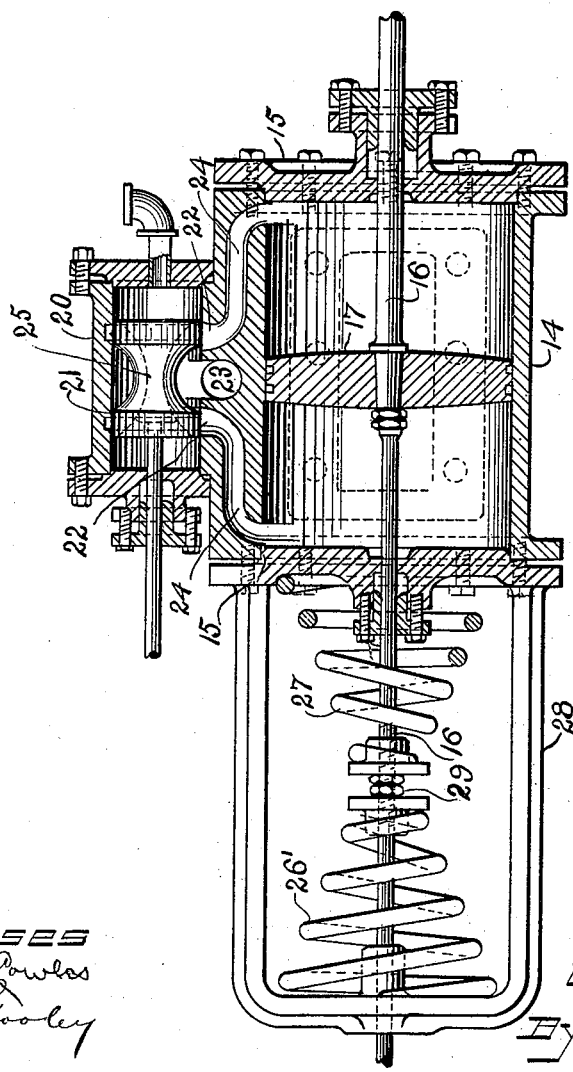
Witnesses
Inventor
George A Kelley
By Paul ... 
his attorneys

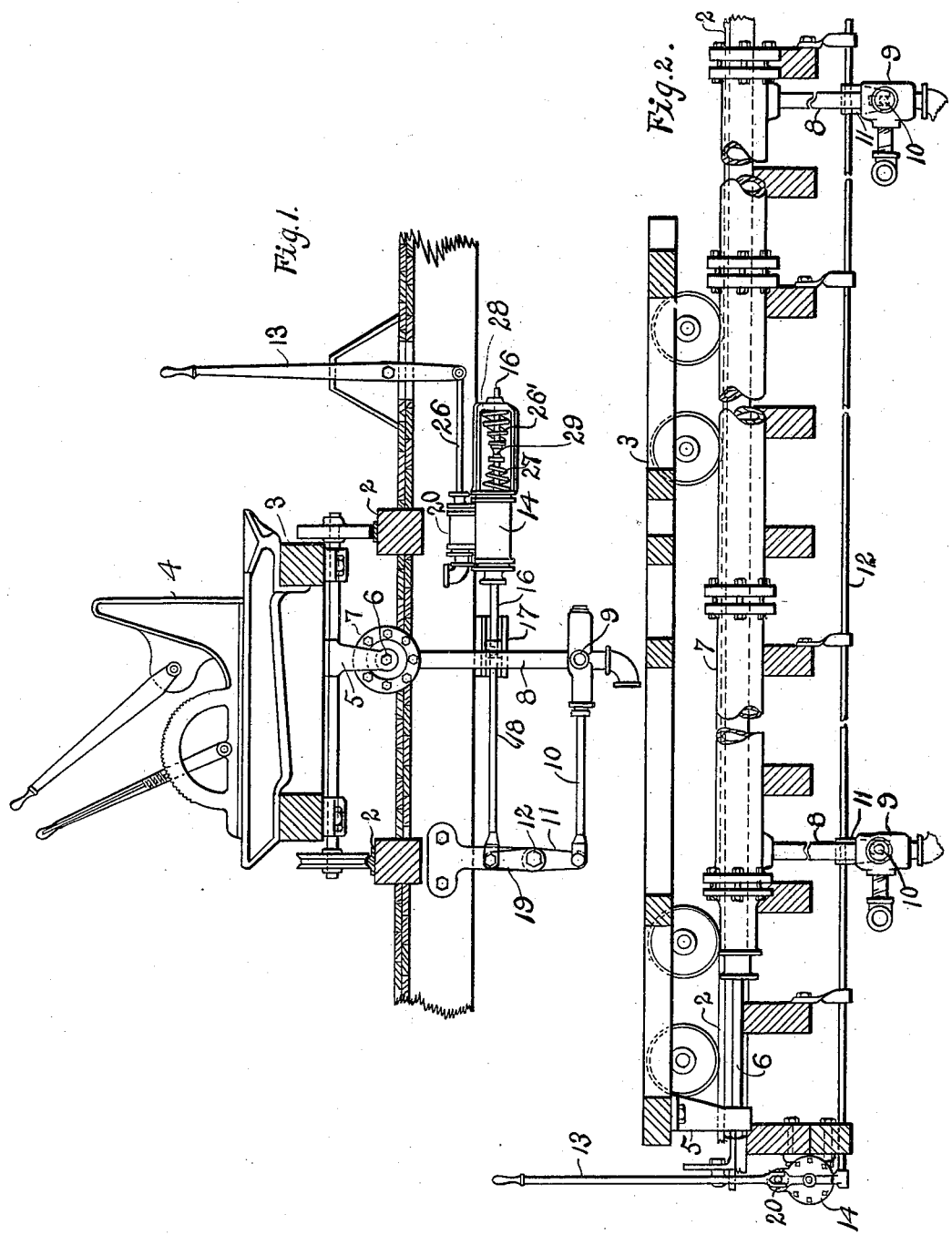

UNITED STATES PATENT OFFICE.

GEORGE A. KELLEY, OF MINNEAPOLIS, MINNESOTA.

OPERATING MECHANISM FOR VALVES.

SPECIFICATION forming part of Letters Patent No. 618,464, dated January 31, 1899.

Application filed August 14, 1897. Serial No. 648,217. (No model.)

*To all whom it may concern:*

Be it known that I, GEORGE A. KELLEY, of the city of Minneapolis, county of Hennepin, State of Minnesota, have invented certain new and useful Improvements in Operating Mechanisms for Steam-Feed Valves, of which the following is a specification.

My invention relates to means for operating the steam-valves of the sawmill steam-feed— that is, the mechanism by which the moving carriage of a sawmill is operated; and the object of my invention is to provide means whereby the sawyer is relieved of the heavy work of operating the valves.

A further and particular object is to provide a hydraulic, steam, or compressed-air mechanism for operating the valves, said mechanism being under the direct control of the sawyer.

My invention consists generally in the combination, with the steam-feed valves, of a piston and cylinder whereby said steam-feed valve or valves may be operated and a valve for controlling the action of the piston in said cylinder, said valve being operated by the sawyer.

The invention will be more readily understood by reference to the accompanying drawings, forming part of this specification, and in which—

Figure 1 is a transverse section of a steam-feed and operating mechanism embodying my invention. Fig. 2 is a longitudinal and vertical section thereof. Fig. 3 is an enlarged longitudinal section of the valve-operating mechanism. Fig. 4 is an end view thereof.

As shown in the drawings, 2 2 represent the track upon which the carriage 3 is adapted to move, said carriage being provided with parts 4 to engage and hold the logs. On the carriage is an arm 5, connected with the piston-rod 6 of the piston which is within the long cylinder 7. The steam enters and escapes from the cylinder 7 through pipes 8. Each of these pipes 8, arranged at opposite ends of the cylinder 7, is preferably provided with a valve 9, having ports by which the steam is allowed to enter or pass from the pipes 8. If desired, but one valve need be employed to regulate the inlet and exhaust of steam to and from the cylinder 7. The valves 9 are preferably piston-valves, and the rods 10 thereof are connected by arms 11 and the rocker-shaft 12. When the shaft is rocked, and this is usually done by means of the sawyer's lever, the two valves 9 are respectively opened and closed to the supply of steam, and vice versa with respect to the exhaust of steam, or both valves are closed to stop the piston in the cylinder 7, and thereby stop the carriage.

In place of connecting the rock-shaft 12 direct with the sawyer's lever 13 I interpose a power mechanism for rocking said shaft and place said power mechanism under the easy control of the sawyer. This mechanism comprises a small cylinder 14, each head 15 of which is preferably provided with a gland or stuffing-box for the piston-rod 16 of the piston 17 within the cylinder 14. One end of the piston-rod 16 extends to a suitable cross head or guide 17, and is there connected to a connecting rod or link 18, which couples the piston-rod and the arm 19 on the rocking shaft 12. As the piston 17 is forced backward or forward, therefore, said shaft is partially rotated to operate the steam-feed valves 9.

On the cylinder 14 is a steam-chest 20, provided with the piston or plunger valve 21, adapted to control the inlet and exhaust of steam, air, or liquid to and from the cylinder 14 through suitable ports 23 and ducts 24. This valve may be of any suitable construction; but I prefer to make the ports 22 so that they will lap into the exhaust-cavity 25 of the valve 21 when said valve is in its central position over the exhaust-ports 23, thereby permitting the equalization of the pressure upon the two sides of the piston 17 by the escape of fluid or steam from the cylinder. The valve 21 is operated by the lever 13, which is connected to the valve-rod.

In connection with the piston and the cylinder I employ opposing centering-springs 26 and 27 at one end of the cylinder and in connection with the piston-rod. These springs are preferably held against the end of the cylinder and in a yoke 28, and the springs are adjustable by means of collars and set-nuts 29 on the piston-rod 16. When the pressure is relieved from either end of the cylinder by throwing the valve 21 to its central position, and thereby opening the exhaust from both ends of the cylinder, the springs or cushions 26 27 will quickly return the piston 17 to the central or middle position in the cylinder 14, thereby operating the rocking shaft 12 and setting the two valves 9 in their middle positions to stop the movement of the carriage.

It will be seen that by this mechanism the steam-feed valves, which are ordinarily difficult of operation, may be moved and shifted with very little effort upon the part of the sawyer. The rapidity of the movement is increased and the sawyer is given a much more positive and accurate control of the carriage.

Having thus described my invention, I claim as new and desire to secure by Letters Patent—

1. The combination, with the steam-feed cylinder and the valves thereof, a second cylinder, a piston therein connected to operate said steam-feed valves, a centering appliance connected with said piston, and a valve for controlling the action of said piston in said second cylinder, the exhaust-cavity of said valve adapted to lap over both inlet-ports of said cylinder, whereby said piston is relieved of pressure to be returned by said centering appliance, substantially as described.

2. The combination, with a steam-feed cylinder and its valves, a second cylinder, a piston therein connected to operate said steam-feed valves, a valve for controlling the action of said piston in said second cylinder, and a centering appliance connected with said piston comprising a yoke 28 and opposing centering-springs 26 and 27, and adjusting devices provided on said piston, for the purpose set forth.

3. The combination, with a steam-feed cylinder having its piston connected to the sawmill-carriage and provided with valves for controlling the admission of steam to said cylinder, of a second cylinder, a rock-shaft connected with said valves and with the piston in said second cylinder, a valve controlling the admission of steam to said second cylinder and a lever for operating said valve, substantially as described.

In testimony whereof I have hereunto set my hand this 12th day of July, A. D. 1897.

GEORGE A. KELLEY.

In presence of—
A. C. PAUL,
A. F. HOLMES.